US008286321B2

(12) United States Patent
Stahlhut

(10) Patent No.: US 8,286,321 B2
(45) Date of Patent: Oct. 16, 2012

(54) METHOD OF CONSTRUCTING A WIPER ARM ASSEMBLY HAVING A LOCKING ARM

(75) Inventor: Alan J. Stahlhut, Valparaiso, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 13/181,004

(22) Filed: Jul. 12, 2011

(65) Prior Publication Data

US 2011/0265306 A1 Nov. 3, 2011

(51) Int. Cl.
*B60S 1/34* (2006.01)

(52) U.S. Cl. ............... 29/428; 15/250.352; 15/250.351; 15/250.001

(58) Field of Classification Search ............. 29/428; 15/250.001, 250.19, 250.351, 250.352, 250.31
See application file for complete search history.

(56) References Cited

U.S. PATENT DOCUMENTS

| | | | |
|---|---|---|---|
| 3,729,767 A | 5/1973 | Edele et al. |
| 4,170,804 A | 10/1979 | Scotcher |
| 4,251,899 A | 2/1981 | Hoyler |
| 4,564,971 A | 1/1986 | Pethers et al. |
| 4,704,761 A | 11/1987 | South et al. |
| 4,741,068 A | 5/1988 | Roth |
| 4,991,251 A | 2/1991 | Egner-Walter et al. |
| 5,079,793 A | 1/1992 | Isii |
| 5,165,159 A | 11/1992 | Egner-Walter et al. |
| 5,435,042 A | 7/1995 | Arai et al. |
| 6,223,778 B1 | 5/2001 | Bucher et al. |
| 6,394,688 B1 | 5/2002 | Kraemer |
| 6,553,608 B2 | 4/2003 | Kraus et al. |
| 6,640,381 B1 | 11/2003 | Zimmer |
| 6,658,691 B2 | 12/2003 | Muramatsu |
| 6,782,581 B2 | 8/2004 | Block |
| 7,992,249 B2 * | 8/2011 | Stahlhut ............ 15/250.352 |
| 2003/0110587 A1 | 6/2003 | Ritt |
| 2004/0025282 A1 | 2/2004 | Zimmer et al. |

FOREIGN PATENT DOCUMENTS

| | | |
|---|---|---|
| EP | 0755833 | 1/1997 |
| JP | 63017149 | 1/1988 |
| JP | 10129424 | 5/1998 |
| JP | 2001010450 | 1/2001 |
| JP | 20010101450 | 1/2001 |
| JP | 2001080466 | 3/2001 |
| JP | 2004249823 | 9/2004 |
| JP | 2006240364 | 9/2006 |

\* cited by examiner

*Primary Examiner* — Gary Graham
(74) *Attorney, Agent, or Firm* — Robert L. Stearns; Dickinson Wright, PLLC

(57) ABSTRACT

A wiper arm assembly and method of construction thereof includes a mounting head and a wiper arm configured for relative rotation during assembly from a disassembled position to a shipping position, wherein the wiper arm and mounting head are locked against rotation toward the disassembled position once in the shipping position. The mounting head and wiper arm have locking surfaces configured for locked engagement with one another while in the shipping position. The locking surfaces are brought into engagement with one another by a force imparted by a spring while rotating the mounting head relative to the wiper arm from the disassembled position toward the shipping position. When in the shipping position, the locking surfaces confront each other and prevent the mounting head and the wiper arm from rotating back toward the disassembled position from the shipping position.

7 Claims, 10 Drawing Sheets

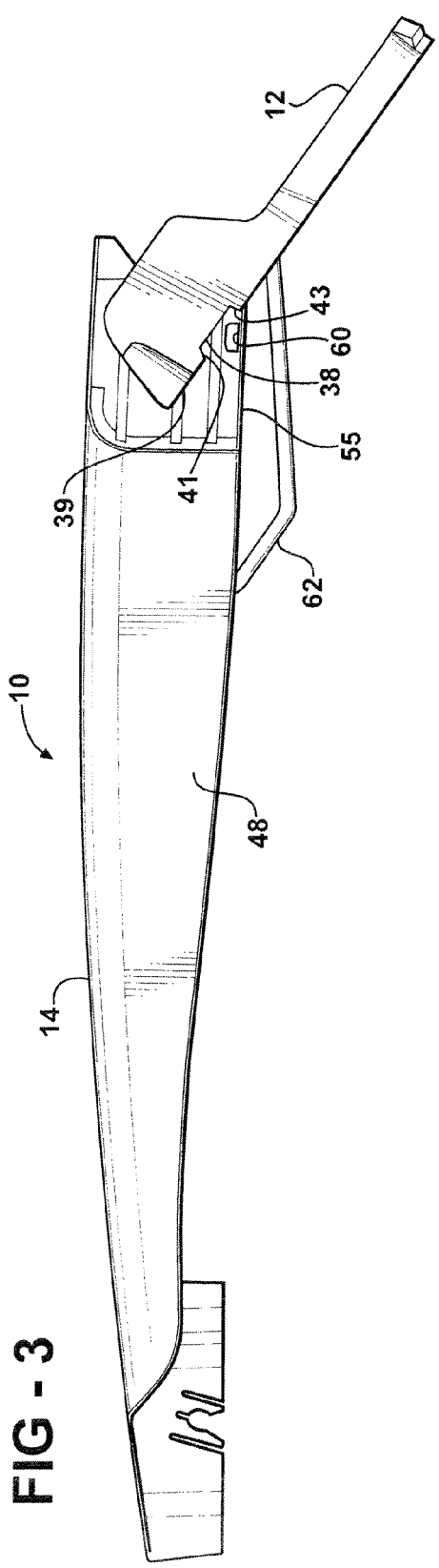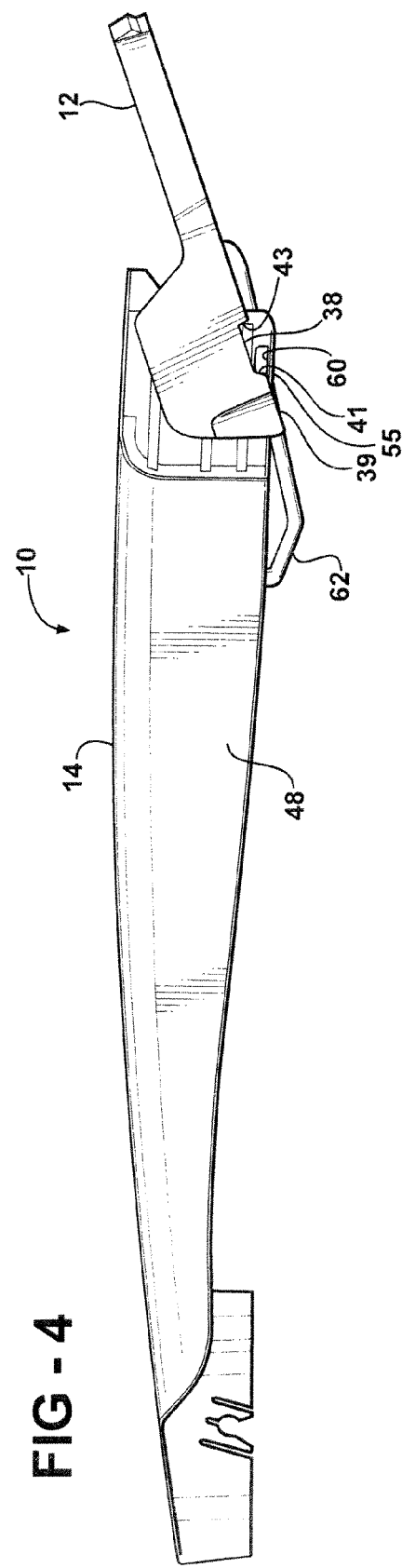

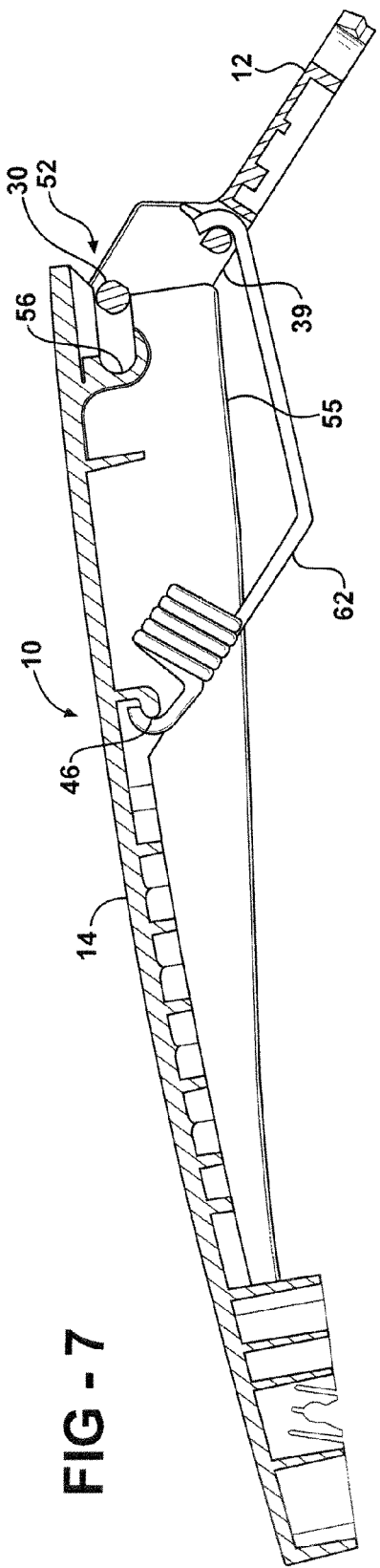
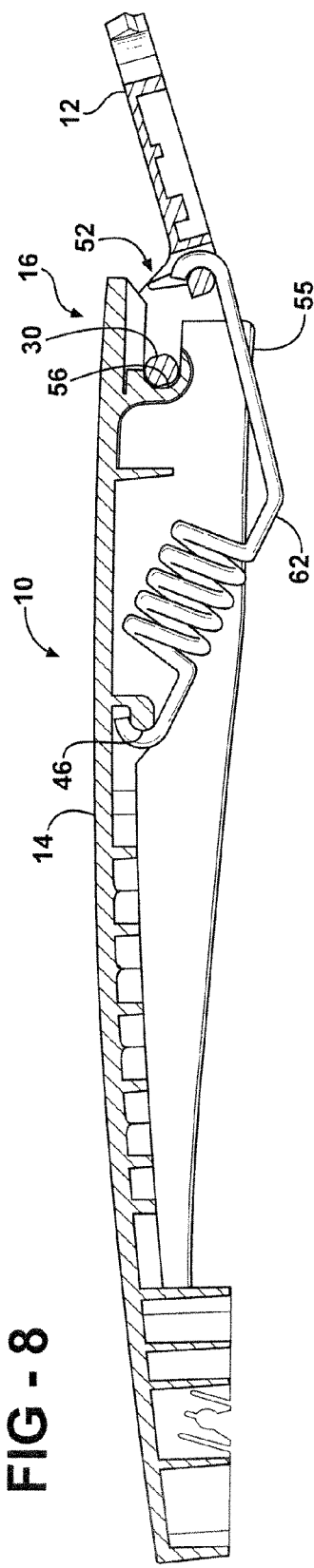

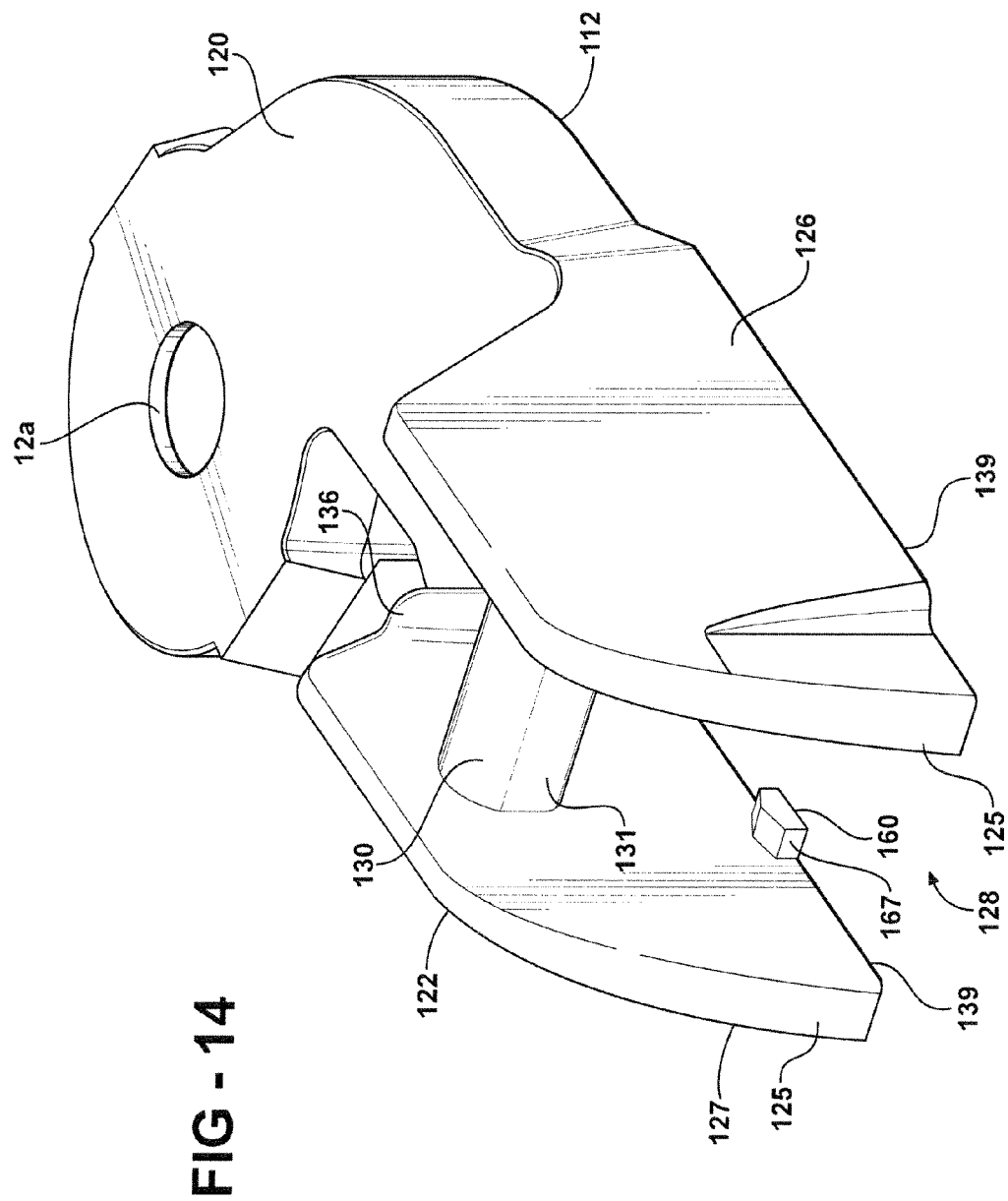

METHOD OF CONSTRUCTING A WIPER ARM ASSEMBLY HAVING A LOCKING ARM

CROSS-REFERENCE TO RELATED APPLICATION

This application claims the benefit of U.S. Provisional Application Ser. No. 60/863,436, filed Oct. 30, 2006, and U.S. patent application Ser. No. 11/926,543, filed Oct. 29, 2007, which are incorporated herein by reference in their entirety.

BACKGROUND OF THE INVENTION

1. Technical Field

This invention relates generally to wiper arm assemblies for vehicles, and more particularly to wiper arm assemblies having a mounting head for attachment to a vehicle and a wiper arm attached for articulation relative to the mounting head, and methods of construction thereof.

2. Related Art

Wiper arm assemblies for vehicles are known to have a wiper arm hinged for articulation relative to a mounting head. The mounting head facilitates attachment of the assembly to a surface on the vehicle so that a wiper blade attached to the wiper arm is suitably positioned for oscillation against a window. The wiper arm and wiper blade attached thereto can generally be articulated relative to the mounting head away from the window to a service-up position to facilitate replacing the wiper blade.

It is known to manufacture wiper arm assemblies with the mounting head and wiper arm permanently fixed to one another by a staked pin or rivet. In this type of construction, the pin or rivet is assembled between axially aligned openings in the mounting head and wiper arm, and then the pin or rivet is fixed therein to permanently couple the parts together sot that they can not be taken apart thereafter. At some point in assembly, one end of a coil spring is attached to the mounting head, and an opposite end of the coil spring is attached to the wiper arm. The force imparted by the coil spring maintains the wiper blade in wiping engagement with the window as the mounting head is oscillated by a drive motor. The spring also allows the wiper arm to be articulated away from the window by manually lifting the wiper arm, such that the wiper blade can be serviced, as necessary. Though this type of wiper arm assembly works well in use, it typically comes with increased cost in manufacturing and assembly due to the added cost associated with the pin or rivet and the processes for permanently fixing the mounting head and wiper arm together.

It is also known to manufacture wiper arm assemblies with the mounting head and wiper arm attached to one another such that they can be disassembled from one another after being assembled in a "preassembled" position. A preassembled position is defined when the mounting head and wiper arm are attached together, but not yet assembled to a vehicle. In one known construction, as disclosed in the prior art section of U.S. Pat. No. 6,553,608 (the '608 patent), the mounting head and wiper arm are attached together under a preload of a tension spring, with an axle on one of the parts being received to form a hinged connection in an open hub of the other part. Bearing surfaces on the mounting head and wiper arm are pulled into engagement with one another along a line of force imparted by the tension spring. The opposing reaction forces between the bearing surfaces act to maintain the mounting head and wiper arm in the preassembled position until the wiper arm assembly is fully assembled to a vehicle. Unfortunately, the bearing surfaces are not prevented from moving back toward a disassembled direction and can slide relative to one another under a minimal force, which can occur during transport or during careless handling, whereupon the mounting head and wiper arm can become inadvertently disassembled.

To combat the problem of inadvertent disassembly set out in the prior art section of the '608 patent, the '608 patent teaches forming the bearing surfaces as being arranged to define interacting camming surfaces. In order for the mounting head and wiper arm to be disassembled from their preassembled position, the bearing surfaces require the spring attaching the mounting head and the wiper arm to be increased in length, thus requiring an increased tensile force to be overcome prior to the parts becoming disassembled from one another. Upon the bearing surfaces overcoming a cam lobe, the point at which the tensile spring is at its greatest length, the length of the spring is allowed to decrease, thereby causing a tensile force imparted by the spring to disassemble the mounting head and the wiper arm from one another. Accordingly, the '608 patent teaches that the mounting head can still be disassembled from the wiper arm by rotating the wiper arm relative to the mounting head toward the disassembled direction with a sufficient torque to overcome the cam lobe.

SUMMARY OF THE INVENTION

A wiper arm assembly has a mounting head and a wiper arm for relative rotation therewith, wherein the wiper arm and mounting head are locked against disassembly upon be assembled to a shipping position. The mounting head has one of an axle or a hub, while the wiper arm has the other of the axle or hub. The hub has a pocket with an open end for receipt of the axle for rotation therein. A spring is arranged for operable attachment to the mounting head and the wiper arm. The mounting head and wiper arm have locking surfaces arranged for engagement with one another while in the shipping position. The locking surfaces are brought into confronting engagement with one another under a force imparted by the spring while rotating the mounting head relative to the wiper arm from a disassembled position toward the shipping position. The locking surfaces confront each other, thereby preventing the mounting head and the wiper arm from rotating back toward the disassembled position from the shipping position.

Another aspect of the invention provides a method of assembling a wiper arm assembly. The method starts with providing a mounting head having a locking surface and one of an axle or a hub, wherein the hub has a pocket with an open end for receipt of the axle. Further, providing a wiper arm having a locking surface and the other of the axle or the hub. Then, attaching a spring to the mounting head and the wiper arm, and rotating the mounting head and the wiper arm relative to one another from a disassembled position toward a shipping position and causing the spring to initially increase in preload and the axle to be received in the hub. Lastly, engaging the locking surfaces on the mounting head and the wiper arm into with one another into the shipping position under a force imparted by the spring during the rotating step. The locking surfaces preventing the mounting head and the wiper arm from rotating back toward the disassembled position.

Accordingly, a wiper arm assembly constructed in accordance with the invention, by way of example and without limitation, provides a wiper arm assembly that is easy to assemble, economical in manufacture, prevented from becoming inadvertently disassembled, and has a long and useful life.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 3 is a view similar to FIG. 1 while in a partially assembled position;

FIG. 4 is a view similar to FIG. 1 while in a service-up position;

FIG. 7 is a view similar to FIG. 5 while in the partially assembled position;

FIG. 8 is a view similar to FIG. 5 while in the service-up position;

FIG. 14 is a perspective view of a mounting head for a wiper arm assembly constructed according to another embodiment.

DETAILED DESCRIPTION OF PRESENTLY PREFERRED EMBODIMENTS

Figure 1:
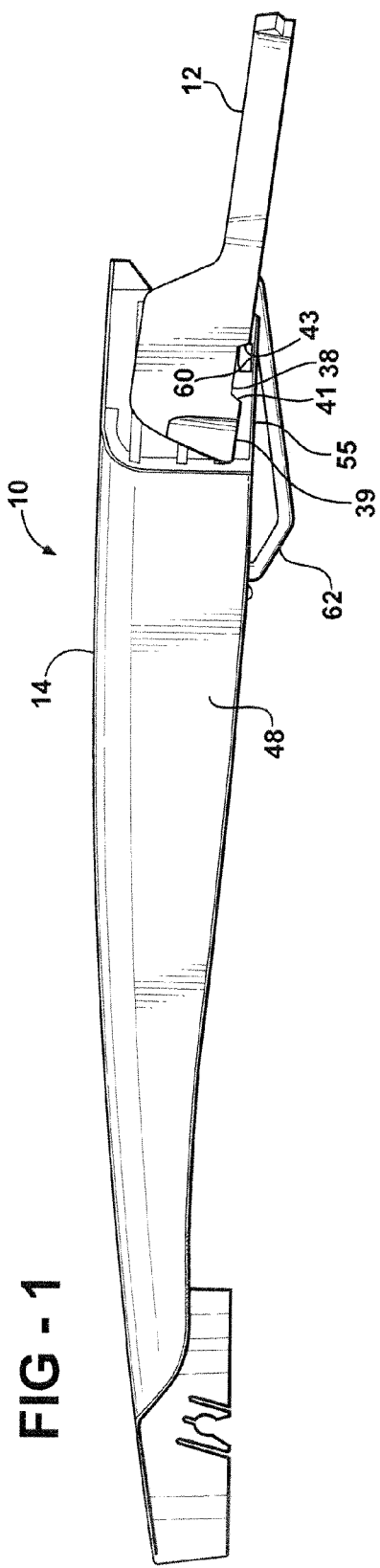
FIG. 1 is a side view of a wiper arm assembly constructed according to one presently preferred embodiment of the invention while in a shipping position.
Figure 2:
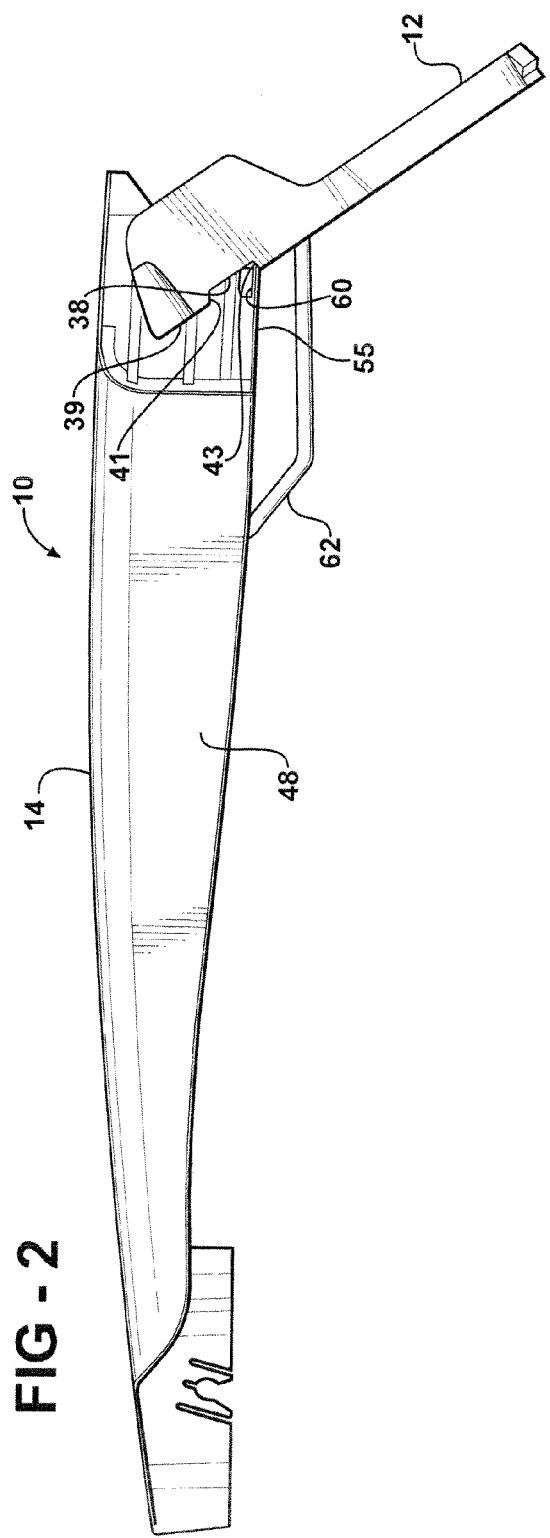
FIG. 2 is a view similar to FIG. 1 while in a disassembled position.
Figure 5:
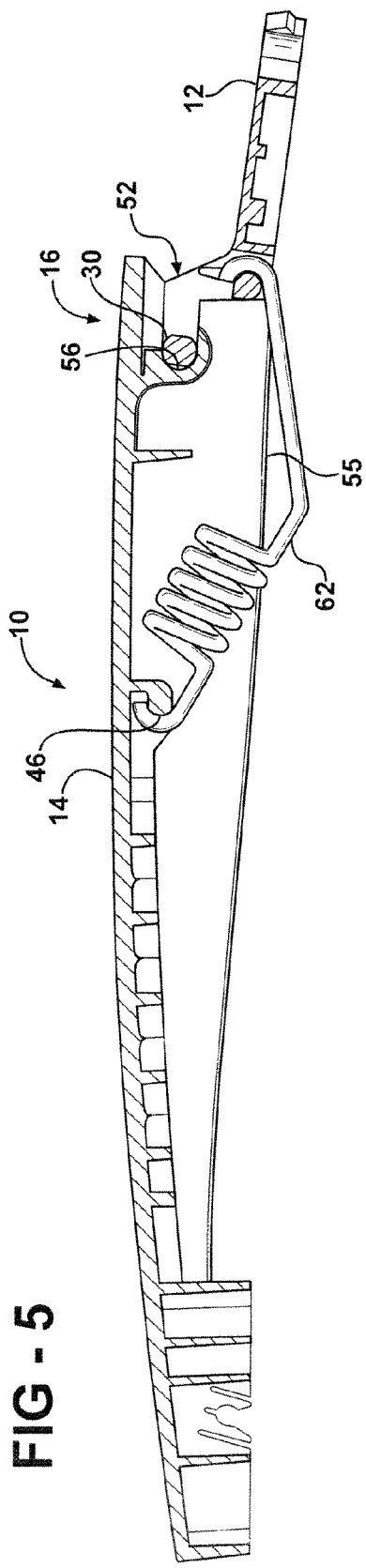
FIG. 5 is a cross-sectional view taken generally along the central axis of the wiper arm assembly while in the shipping position.
Figure 6:
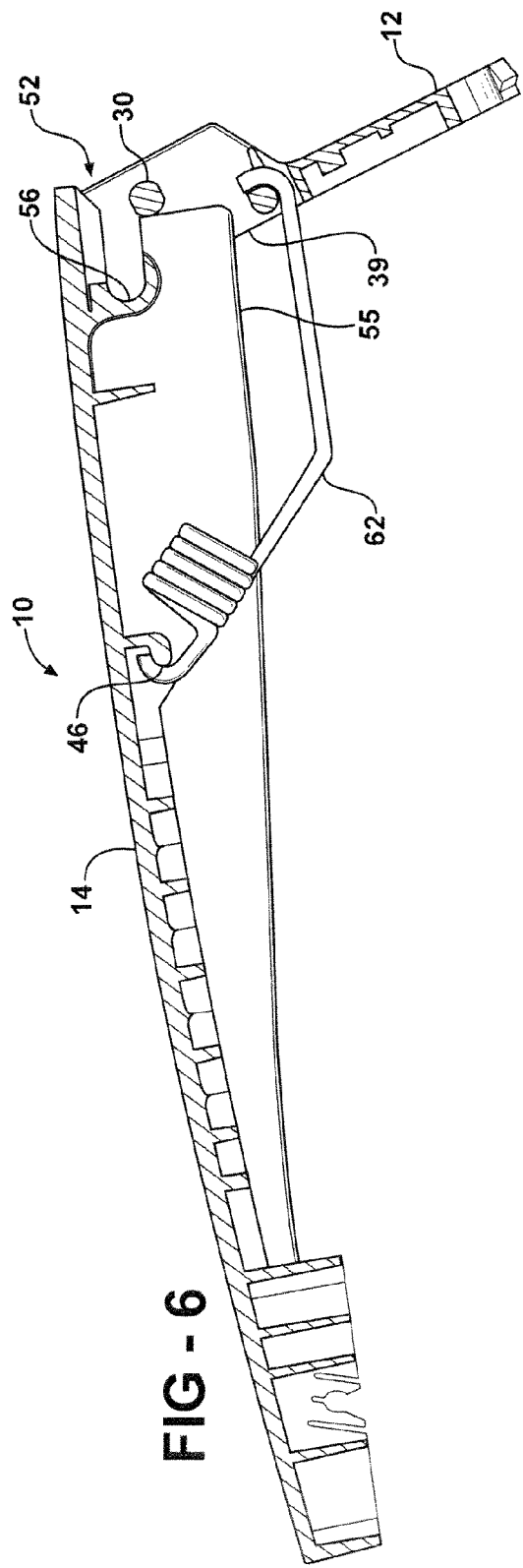
FIG. 6 is a view similar to FIG. 5 while in the disassembled position.
Figure 9:
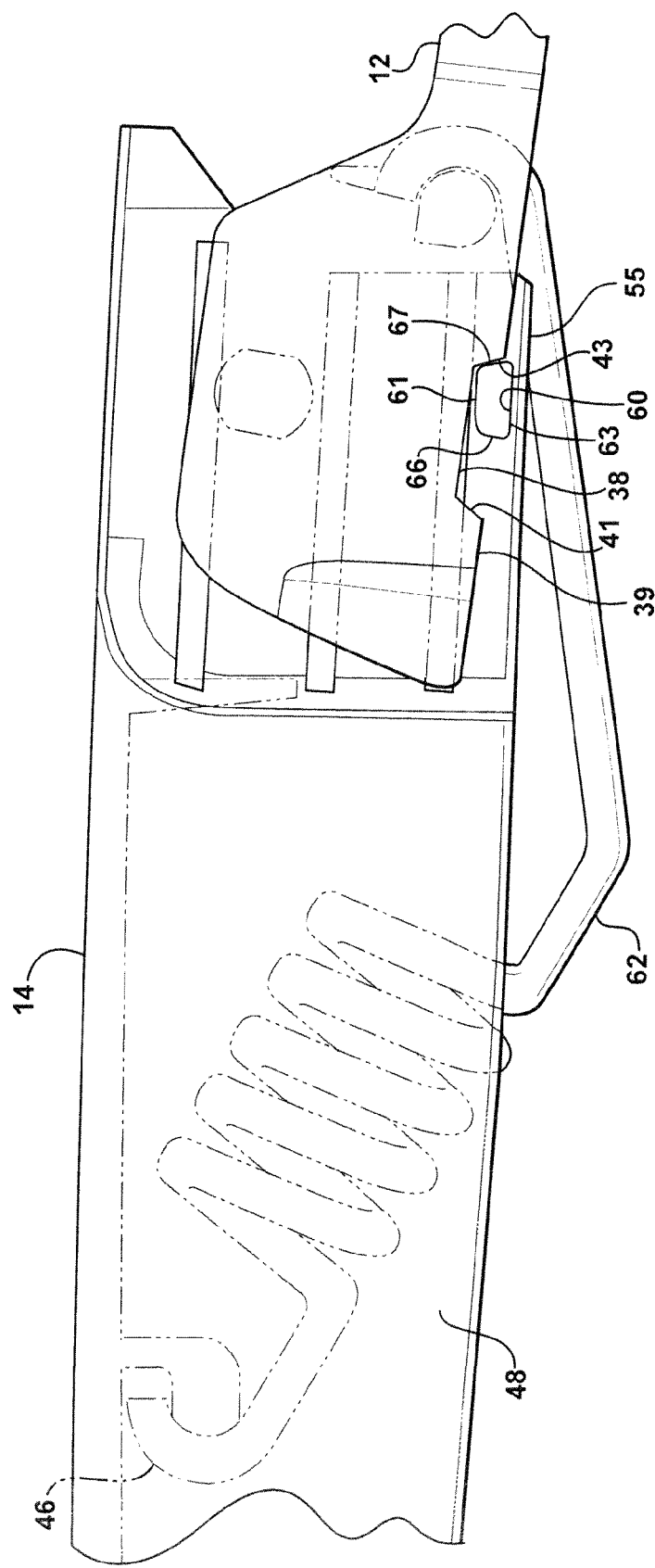
FIG. 9 is an enlarged partial view of the wiper arm assembly showing hidden features while in the shipping position.
Figure 10:
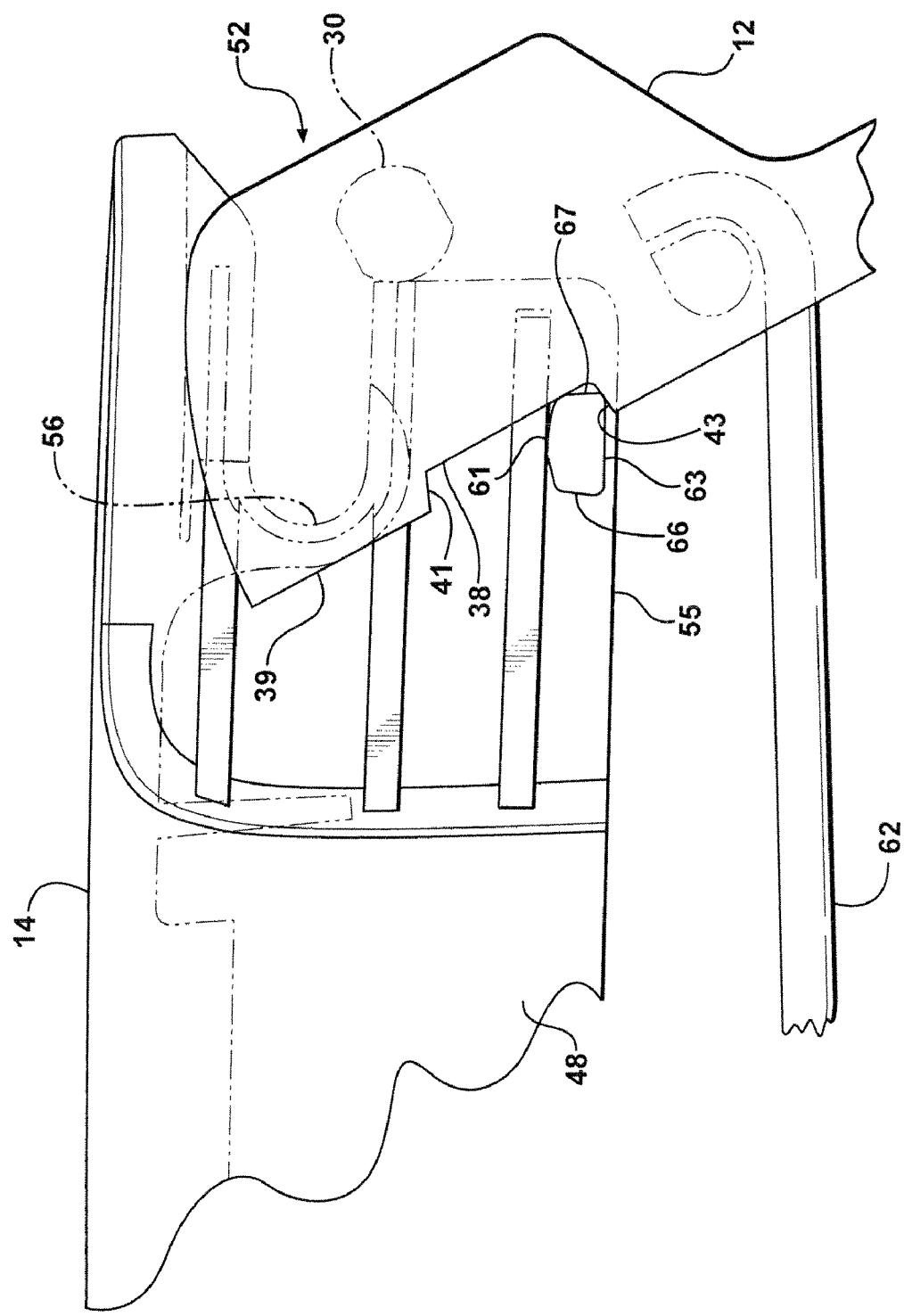
FIG. 10 is a view similar to FIG. 9 while in the disassembled position.

Referring in more detail to the drawings, FIGS. 1-4 show a wiper arm assembly 10 constructed according to one presently preferred embodiment of the invention. The wiper arm assembly 10 has a mounting head 12 to facilitate attachment of the assembly 10 to a vehicle, and a wiper arm 14 for operable attachment of a wiper blade (not shown) to the assembly 10. The wiper arm 14 is attached for articulated movement to the mounting head 12 via a hinged joint 16 so that the wiper arm 14 can be pivoted in use and during assembly to a vehicle between a preassembled position, referred to hereafter as a shipping position (FIGS. 1, 5 and 9), and a fully assembled position (not shown), wherein the assembly 10 is mounted to a vehicle. While in the shipping position, a locking mechanism 18 acts between the mounting head 12 and wiper arm 14 to prevent them from pivoting from the shipping position back toward a disassembled position (FIGS. 2, 6 and 10). Accordingly, the wiper arm assembly 10 is prevented from becoming inadvertently disassembled, such as during shipping or while being handled prior to being attached to the vehicle.

Figure 11:
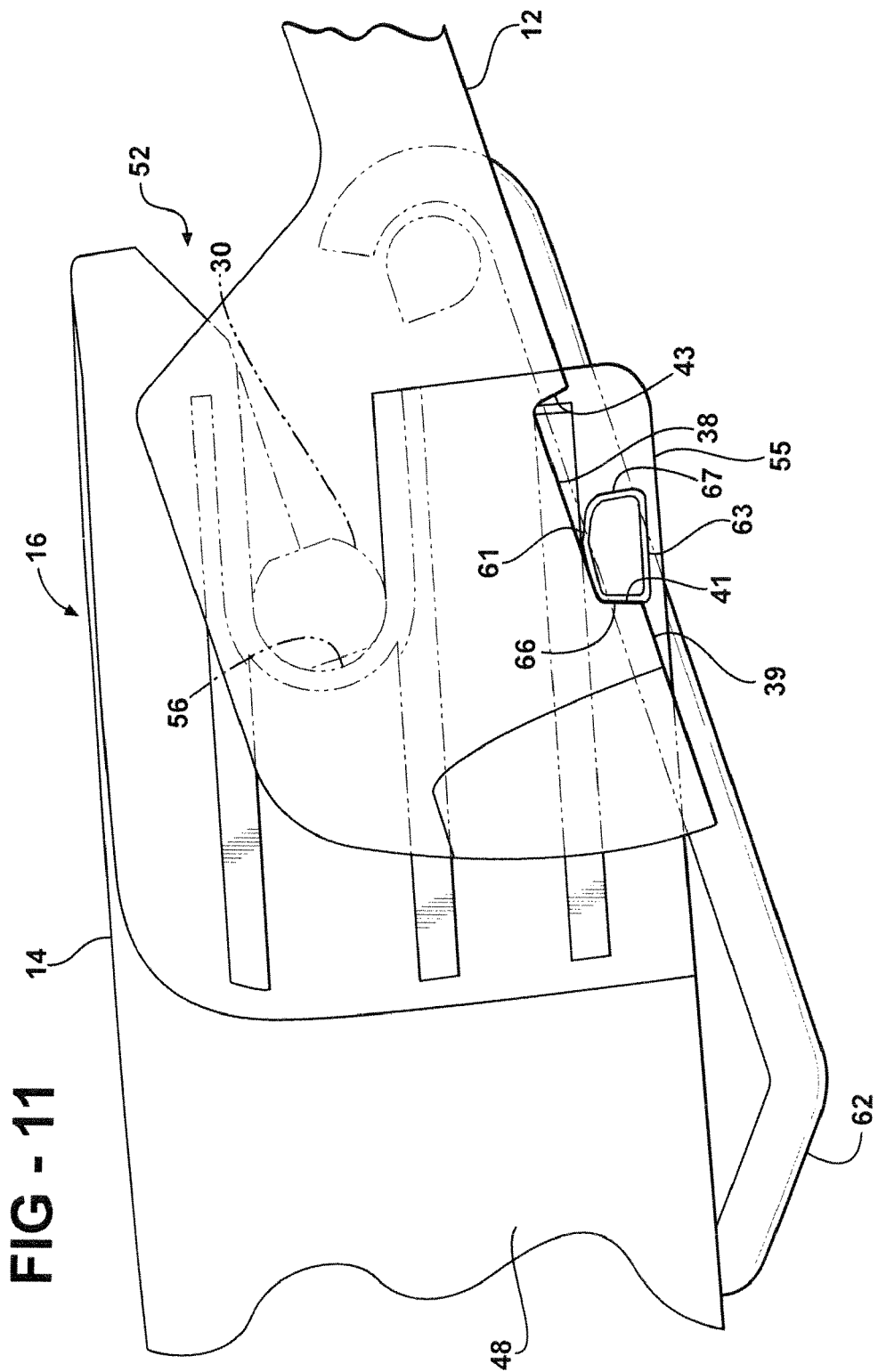
FIG. 11 is a view similar to FIG. 9 while in the service-up position.
Figure 12:
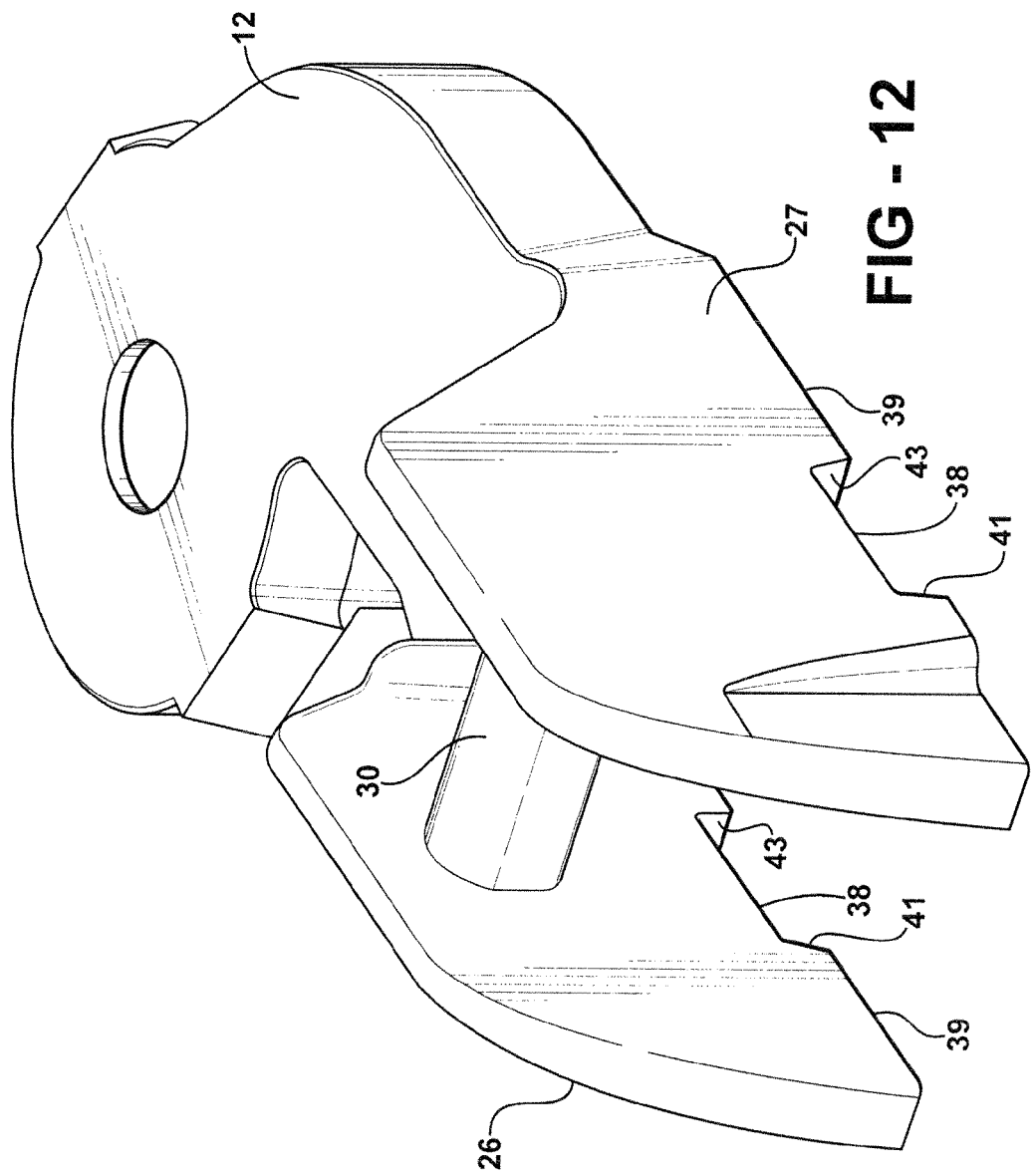
FIG. 12 is a perspective view of a mounting head of the wiper arm assembly.

As best shown in FIG. 12, the mounting head 12 has a mounting portion 20 and a hinge portion 22. The mounting portion 20 preferably has an opening 24 to facilitate attachment of the assembly 10 to the vehicle via a standard fastener. The hinge portion 22 is adjacent an end 25 opposite the opening 24, and is adapted to allow the wiper arm 14 to articulate relative to the mounting head 12. The mounting head 12 has a pair of laterally spaced sidewalls 26, 27 providing a generally open channel 28 therebetween. An axle 30 of a predetermined diameter extends between the sidewalls 26, 27. The axle 30 preferably has a generally cylindrical bearing surface 31 facing the end 25 that is preferably spaced a predetermined distance from the end 25. The mounting head 12 has a spring attachment feature, represented here, by way of example and without limitations, as a spring pin 32 (FIGS. 5-11) extending between the sidewalls 26, 27. To further provide the attachment feature, a through opening 34 is preferably formed adjacent the spring pin 32. The spring pin 32 is located generally between the axle 30 and the mounting portion 20. The mounting head 12 preferably has at least one, and shown here as a pair of stop surfaces 36 (FIGS. 5-12) arranged to limit the degree of pivot of the wiper arm 14 upwardly from the mounting head 12, from the fully assembled position while on the vehicle to the service-up position (FIGS. 4, 8 and 11). It should be recognized that the degree of movement between the assembled position and the service-up position can be varied, as desired, by altering the stop surfaces 36.

As shown in FIGS. 1-4 and 9-12, the locking mechanism 18 is provided in part on the mounting head 12 by at least one, and preferably a pair of notches 38 extending into bottom surfaces 39 of the sidewalls 26, 27. Each notch 38 extends upwardly into the bottom surfaces 39 of the sidewalls 26, 27 a predetermined distance to a base 40 that extends a predetermined distance along the length of the sidewalls 26, 27. The notches 38 extend between laterally spaced front end walls 41 and rear end walls 43, wherein the rear end walls 43 present locking surfaces, and thus, are referred to as locking surfaces hereafter. The locking surfaces 43 are represented here, by way of example, as being generally flat and extending generally perpendicular to the bottom surfaces 39 of the sidewalls 26, 27.

Figure 13:
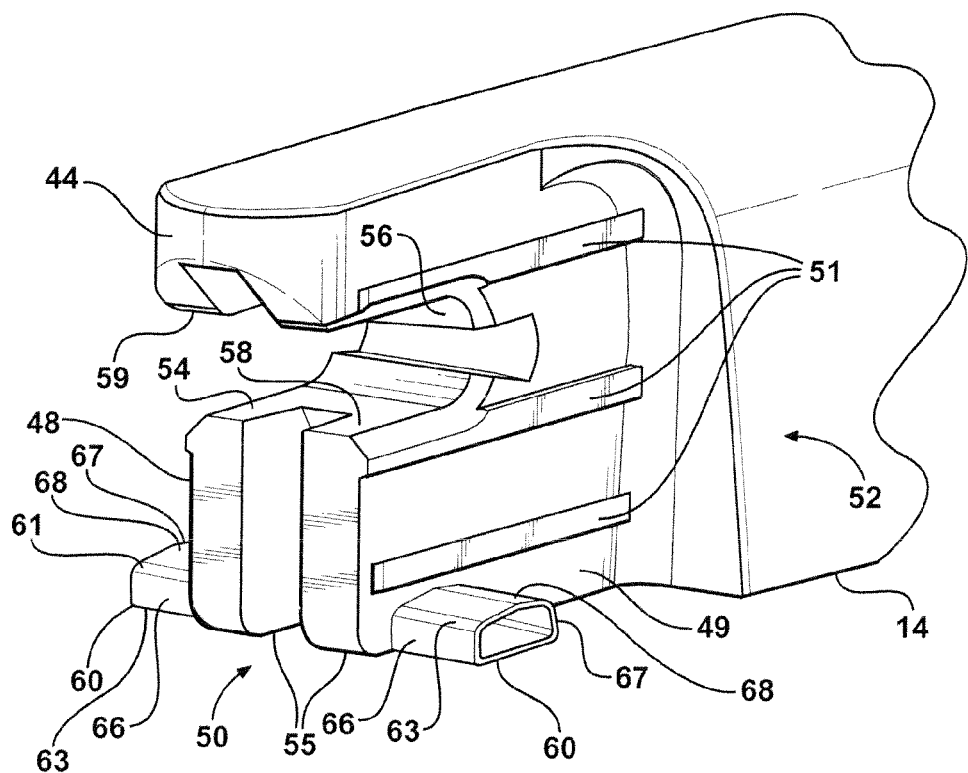
FIG. 13 is partial perspective view of a wiper arm of the wiper arm assembly.

As best shown in FIGS. 1-8, the wiper arm 14 has an elongate body extending between opposite ends 42, 44, with one end 42, for example, being configured for attachment to the wiper blade, and the other end 44 being configured for pivotal attachment to the mounting head 12. To facilitate attachment to the mounting head 12, the wiper arm 14 has a spring attachment feature, shown here as a spring hook 46 (FIGS. 5-8), attached to a bottom surface of the wiper arm 14, and preferably formed as one piece of material therewith. As shown in FIG. 13, the end 44 has a pair of sidewalls 48, 49 laterally spaced from one another by a centrally extending spring channel 50. The sidewalls 48, 49 have outer surfaces arranged for close receipt between the sidewalls 26, 27 of the mounting head 12 and within the open channel 28 of the hinge portion 22. Preferably, to minimize friction in use, the sidewalls 48, 49 have protrusions, represented here by ribs 51, for example, extending outwardly therefrom generally along the length of the sidewalls 26, 27.

The wiper arm end 44 has a hub 52, preferably formed as a monolithic piece of material with the wiper arm 14, although it could be formed as a separate piece and attached thereafter. The hub 52 has a pocket 54 extending into the end 44 a predetermined distance to a closed seating surface 56. The seating surface 56 is preferably substantially cylindrical to conform generally to the generally cylindrical bearing surface 31 on the axle 30. The pocket 54 is defined in part by opposite lower and upper walls 58, 59, respectively, preferably spaced from one another for close receipt of the axle 30, such that the axle 30 can oscillate within the pocket 54.

Each of the sidewalls 48, 49 has arms 60 extending laterally outwardly therefrom, to form a portion of the locking member 18. The arms 60 are preferably molded as one piece with the wiper arm 14, though they could be attached as separate pieces, if desired. The arms 60 extend laterally outwardly from the sidewalls 48, 49 a distance sufficient to be received in the notches 38 in the mounting head 12 upon being assembled in the shipping position. As best shown in FIGS. 9-11 and 13, the anus 60 each have upper surfaces 61 and lower surfaces 63 spaced by front and rear sidewalls 66, 67, respectively, wherein the rear sidewalls 67 act as and present locking surfaces while in the shipping position. The lower surfaces 63 are generally flat and are located adjacent a bottom surface 55 of the hub 52. The upper surfaces 61 preferably have an apex 68 extending generally perpendicular to the sidewalls 48, 49 with surfaces 70, 71 sloping downwardly therefrom toward the respective front and rear sidewalls 66, 67. Accordingly, the upper surfaces 61 have a generally inverted v-shape.

To assemble the mounting head 12 to the wiper arm 14, a spring, shown here as a coil spring 62, is tensioned between the mounting head 12 and the wiper arm 14. The coil spring 62 has hooked, generally c-shaped opposite ends 64, 65, with one end 64 being attached to the spring pin 32 of the mounting head 12 and the other end 65 being attached to the spring hook 46 of the wiper arm 14. Upon attaching the coil spring 62, the wiper arm assembly 10 is in its disassembled position (FIGS. 2, 6 and 10). While in the disassembled position, the wiper arm assembly 10 is generally able to fall apart. The axle 30 is in abutting contact with the end 44 of the wiper arm 14 adjacent the pocket 54 of the hub 52.

To proceed in assembly, the mounting head 12 and wiper arm 14 are rotated relative to one another, with the mounting head 12 moving counter clockwise, as viewed in FIGS. 3 and 7, wherein the mount head 12 and wiper arm 14 are shown in a partially assembled position. In this position, the axle 30 begins to enter the pocket 54, and the notches 38 pivot generally over the anus 60 on the wiper arm 14. In the partially assembled position, the coil spring 62 is increased in length sufficiently from that of the disassembled position until the axle 30 is able to be received in the pocket 54 without interference from the upper wall 59 of the hub 52. Accordingly, the mounting head 12 is rotated during assembly until the axle 30 is able to translate along the length of the pocket 54 under the tension imparted by the coil spring 62. At that time, the spring 62 pulls the axle 30 toward the seating surface 56, wherein the bearing surface 31 of the axle 30 engages the seating surface 56 and the arms 60 are received in the notches 38.

When the axle 30 is pulled into engagement with the seating surface 56 and into the shipping position, the base 40 of each notch 38 is moved into engagement with the respective upper surfaces 61 of the arms 60, wherein the generally flat locking surfaces 43 of the notches 38 are pulled into flush mating engagement with the generally flat locking surfaces 67 of the arms 60. The locking surfaces 43 of the notches 38 remain engaged with the locking surfaces 67 of the arms 60 under the biasing tension of the spring 62 (FIGS. 1 and 9). Accordingly, once in the shipping position, the wiper arm assembly 10 is locked against disassembly via rotation of the wiper arm 14 relative to the mounting head 12. If the assembly 10 is to be disassembled, translation of the mounting head 12 relative to the wiper arm 14 is required to clear the respective locking surfaces 43, 67 from engagement with one another. As such, a linear force sufficient to overcome the tension force imparted by the spring 62 must be applied between the mounting head 12 and the wiper arm 14 to translate the axle 30 outwardly from the hub 52 and locking surfaces 43, 67 out of locked engagement with one another. Accordingly, once in the shipping position, the wiper arm assembly 10 is locked against inadvertent disassembly.

While in the shipping position, the front sidewalls 66 of the arms 60 are spaced sufficiently from the front end walls 41 of the notches 38 such that the wiper arm 14 is able to be pivoted upwardly from a fully assembled position while mounted on the vehicle to the service-up position (FIGS. 4, 8 and 11). While in the service-up position, the stop surfaces 36 engage an abutment surface 66 on the wiper arm 14 to limit the pivoting movement of the wiper arm 14 relative to the mounting head 12. While in the service-up position, the front sidewalls 66 of the arms 60 are brought into close relation to the front end walls 41 of the notches 38, and can be brought into engagement therewith, if desired, to define the service-up position in lieu of the stop surfaces 36.

Figure 15:
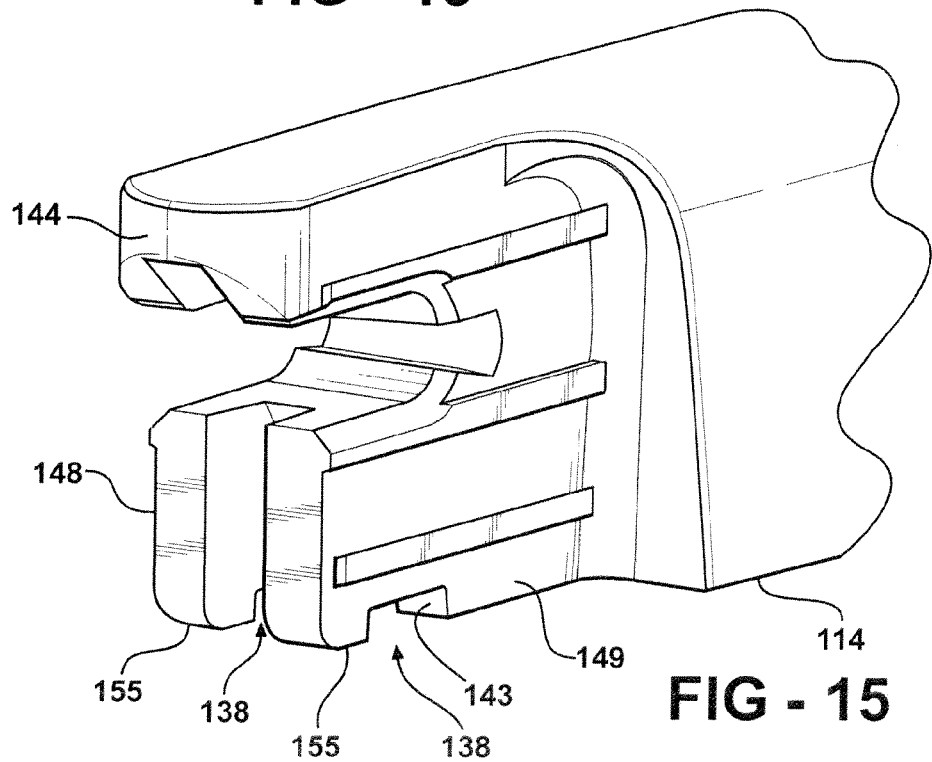
FIG. 15 is partial perspective view of a wiper arm of the wiper arm assembly of FIG. 14.

Obviously, many modifications and variations of the present invention are possible in light of the above teachings. For example, as shown in FIGS. 14 and 15, wherein like features to the embodiment above have reference number offset by 100, rather than the mounting head 12 having notches 38 providing locking surfaces 43 and the wiper arm 14 having arms 60 providing locking surfaces 67, a mounting head 112 could have arms 160 extending from each of the sidewalls 126, 127 adjacent bottoms surfaces 139 toward the other of the sidewalls, such that the arms 160 extend laterally toward one another to provide locking surfaces 167. Further, a wiper arm 114 could have notches 138 extending upwardly into bottom surfaces 155 of the sidewalls 148, 149 to provide locking surfaces 143. It is, therefore, to be understood that within the scope of the appended claims, and any other claims allowed which stem from this application, that the invention may be practiced otherwise than as specifically described and shown.

What is claimed is:

1. A method of constructing a wiper arm assembly, comprising the steps of:
   providing a mounting head having a pair of laterally spaced sidewalls with bottom surfaces and an axle extending between said sidewalls, each of said sidewalls having one of a notch extending upwardly into said bottom surfaces or an arm extending laterally inwardly toward the other of said sidewalls;
   providing a wiper arm having a hub with a pair of laterally spaced sidewalls with bottom surfaces and a pocket with an open end for receipt of said axle for rotation therein, said hub having the other of said notches or said arms, when having said notches, said notches extending upwardly into said bottom surfaces of said hub sidewalls and when having said arms, said arms extending laterally outwardly from said hub sidewalls;
   providing a spring configured for operable attachment to said mounting head and said wiper arm; and
   providing said notches and said arms with locking surfaces; and
   rotating said mounting head relative to said wiper arm in one direction from a disassembled position toward a shipping position and bringing said locking surfaces of said notches and said arms into engagement with one another in said shipping position under a force imparted by said spring, said locking surfaces confronting each other while in said shipping position and preventing said mounting head and said wiper arm from being rotatable under an applied torque force in a direction opposite said one direction back toward said disassembled position from said shipping position.

2. The method of claim 1 wherein said mounting head is provided with said notches and said wiper arm with said arms.

3. The method of claim 2 further including forming said arms with opposite sidewalls extending between upper and lower surfaces, said sidewalls establishing a width of said arms with one of said sidewalls providing said locking surface on said arms.

4. The method of claim 3 further including forming said notches having laterally spaced walls extending a predetermined depth into said sidewalls of said mounting head to a base extending between said laterally spaced walls, said base establishing a width of said notches, said width of said notches being greater than said width of said arms.

5. The method of claim 2 further including configuring said arms and said notches to slide relative to one another upon pivoting said wiper arm in said one direction beyond said shipping position to a service-up position.

6. The method of claim 5 further including providing said hub with a closed seating surface in said pocket and bringing said axle into engagement with said seating surface.

7. The method of claim 6 further including maintaining said axle in engagement with said seating surface while pivoting said wiper arm from said shipping position to said service-up position.

* * * * *

UNITED STATES PATENT AND TRADEMARK OFFICE
CERTIFICATE OF CORRECTION

PATENT NO. : 8,286,321 B2
APPLICATION NO. : 13/181004
DATED : October 16, 2012
INVENTOR(S) : Stahlhut It is certified that error appears in the above-identified patent and that said Letters Patent is hereby corrected as shown below:

Column 5, line 15    "the anus 60" should read "the arms 60"
Column 5, line 44    "the anus 60" should read "the arms 60"

Signed and Sealed this
Twelfth Day of February, 2013

Teresa Stanek Rea
*Acting Director of the United States Patent and Trademark Office*